UNITED STATES PATENT OFFICE.

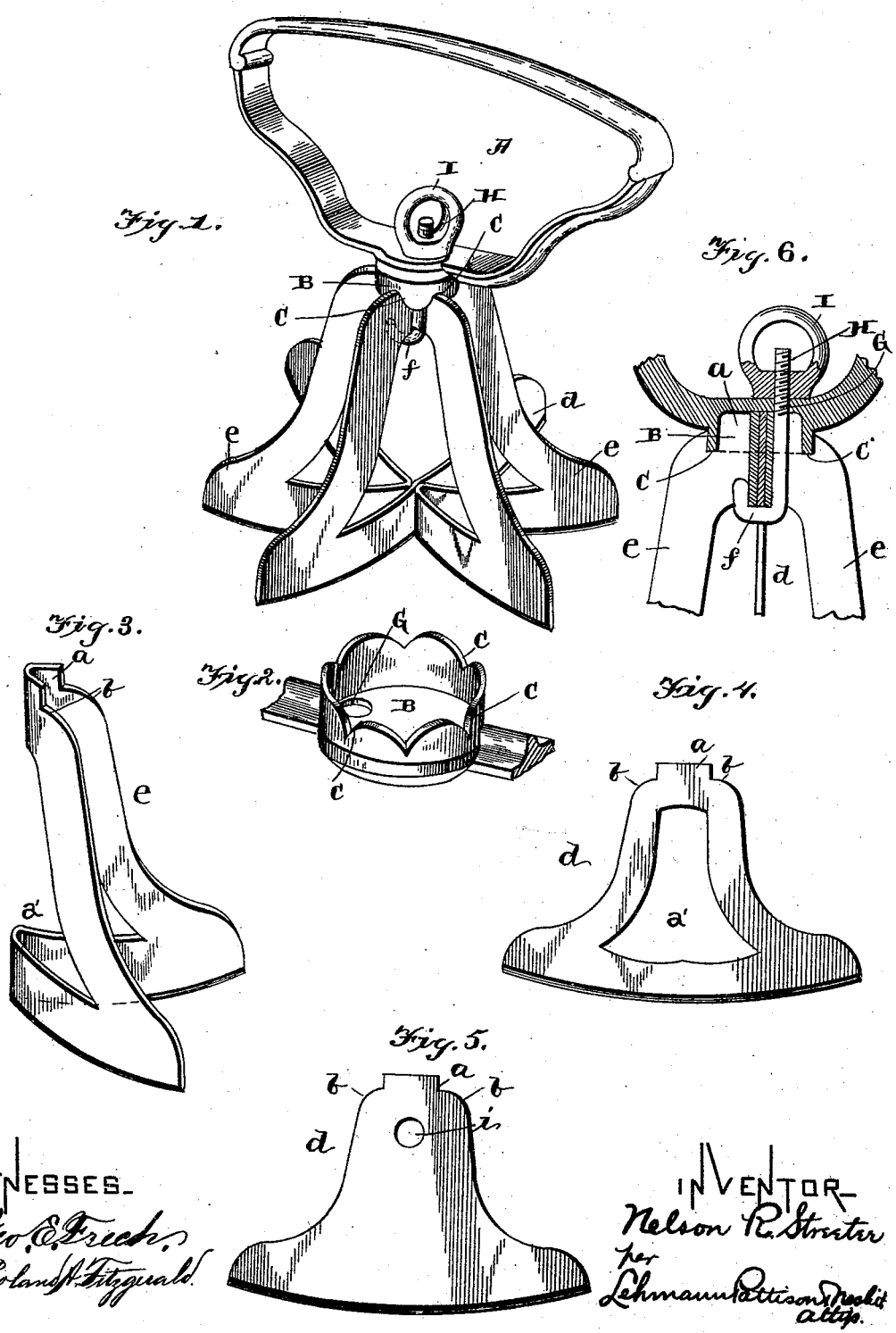

NELSON R. STREETER, OF GROTON, NEW YORK.

VEGETABLE OR MEAT CUTTER.

SPECIFICATION forming part of Letters Patent No. 496,755, dated May 2, 1893.

Application filed December 21, 1892. Serial No. 455,956. (No model.)

*To all whom it may concern:*

Be it known that I, NELSON R. STREETER, of Groton, in the county of Tompkins and State of New York, have invented certain new and useful Improvements in Vegetable or Meat Cutters; and I do hereby declare the following to be a full, clear, and exact description of the invention, such as will enable others skilled in the art to which it pertains to make and use it, reference being had to the accompanying drawings, which form part of this specification.

My invention relates to improvements in vegetable and meat cutters; and it consists in the construction and arrangement of parts which will be fully described hereinafter, and particularly pointed out in the claims.

The object of my invention is to provide a vegetable and meat cutter for household purposes which has a series of radially arranged blades detachably connected at their centers in the manner hereinafter shown and described, to a suitably constructed handle.

In the accompanying drawings:—Figure 1 is a perspective view of a cutter which embodies my invention. Fig. 2 is a view of the handle socket that receives the upper ends of the blades. Fig. 3 is a view of one of the bent blades. Fig. 4 is a view of the straight blade. Fig. 5 is a view showing the blades made without a large central opening. Fig. 6 is a sectional view showing the hook passing through all the blades.

A indicates the handle portion which is preferably made of the shape here shown, and is made of cast metal. At the center of the bottom of this handle is a blade socket B, the edge of this socket being provided with the notches C.

By reference to the separate figures of the blades, it will be noticed that they have their upper ends provided with projections $a$, which extend into the said socket, while the rounded portions $b$, at each side of the projections rest in the notches C of the socket B.

As illustrated in Fig. 1, the blades $d$ and $e$, are provided with large central openings $a'$, the object of which is to prevent clogging of the material being cut. This however is not an essential feature in my invention, as will clearly appear farther on.

Made vertically through the socket B, and at one side of its center is a clamping bolt hole G, through which a clamping bolt H passes to one side of the upper ends of all the blades. This clamping bolt has its upper end screw threaded to receive a thumb nut I, and its lower end formed into a hook $f$, as shown in dotted lines Fig. 1. This hook $f$ of the bolt extends toward the center of the socket, passes through the central openings of all the blades, and then by screwing down upon the thumb nut, the blades are tightly clamped within the socket B, as will be clearly seen.

Attention is called to the fact that the blades $e$, are formed by taking a straight blade, and bending it at its center as clearly illustrated in Fig. 3. Attention is also called to the fact that the clamping bolt hole is made between two of the notches formed in the wall of the socket, for otherwise the edge of the blade could not rest in said notch.

While I prefer to form the blades with large central openings as just described for the free passage of the cut material, yet this is not necessary to enable my invention to be carried out. For instance the blades can be made solid as shown in Fig. 5, in which case they are simply provided with small openings $i$, which receive the hooked end of the clamping bolt.

From the above description it will be seen that I have produced a very simple but very convenient and durable cutter, and one in which the blades can be detached for the purpose of sharpening, or for the purpose of cleansing them and the handle.

Having thus described my invention, what I claim, and desire to secure by Letters Patent, is—

1. A cutter comprising a series of blades radially arranged and provided with a transverse opening in their upper ends, a handle provided with a vertical opening at the point of attachment, and a single clamping bolt passing through the said handle opening and all the openings in the blades.

2. A cutter comprising a series of blades radially arranged and provided with transverse openings in their upper ends, a handle provided with a vertical opening at the point of attachment, and a clamping bolt having a hooked lower end which passes through the openings in all the blades, a vertical screw threaded portion passing through the handle, and a clamping nut.

3. A cutter comprising a handle provided with a socket at its lower end, blades having their upper ends resting in said socket, a vertical opening in said socket at one side of its center, the blades having openings in their upper ends, and a clamping bolt passing through the handle opening and the openings in the blades.

4. A cutter comprising a handle provided with a notched socket and a vertical opening, blades having their upper ends resting in said notches and provided with openings in their upper ends, and a clamping bolt passing through the said handle opening and the openings in the upper ends of the blades.

5. A cutter comprising a handle having a socket provided with vertical openings, blades provided with projections at their upper ends which enter the said socket and openings adjacent thereto, and a clamping bolt which passes through the said handle opening and through the openings in the blades.

6. A cutter comprising a handle having a socket with a depending wall having notches, the top of the socket provided with a vertical opening, blades provided with projections which rest in the said socket and their edges resting in the said notches, and a clamping bolt passing through the said handle opening and the openings in the upper ends of the blades.

7. A cutter comprising a handle provided with a vertical clamping bolt opening, a straight blade, and one or more blades bent at their center with the bent portion adjacent the center of the straight blade and each blade having a transverse clamping bolt opening, and a single clamping bolt passing through the handle opening and all the blade openings.

In testimony whereof I affix my signature in presence of two witnesses.

NELSON R. STREETER.

Witnesses:
C. T. CONVERSE,
CHAS. O. RHODES.